3,827,937
METHOD OF PRODUCING PULLULAN
Koso Kato and Makoto Shiosaka, Okayama, Japan, assignors to Hayashibara Biochemical Laboratories, Incorporated, Okayama-ken, Japan
No Drawing. Filed Oct. 2, 1972, Ser. No. 294,167
Claims priority, application Japan, Oct. 11, 1971, 46/79,413
Int. Cl. C12b 1/00
U.S. Cl. 195—31 P           8 Claims

ABSTRACT OF THE DISCLOSURE

Pullulan is produced by aerobic, microbial fermentation of starch hydrolyzate having a dextrose equivalent (D.E.) of 20–70 in yields superior to those achieved heretofore by fermentation of sucrose or glucose, which are more costly carbon sources.

---

This invention relates to pullulan, and particularly to a method of producing pullulan by culturing suitable microorganisms in a culture medium containing a saccharide as the principal carbon source.

Pullulan is a polysaccharide in which maltotriose units are connected by $\alpha$-1,6-linkages. It readily dissolves in water to form viscous solutions. Water-soluble films suitable as packaging materials may be prepared from the solutions in a known manner, and pullulan may be used as an anti-coagulant for blood in the manner of dextran. Its microbial production by means of *Pullularia pullulans* was discovered by R. Bauer in 1938, its structure has been established by H. Bender et al. (Biochim. Biophys. Acta 36 [1959] 309).

In preparing pullulan by microbial fermentation, sucrose heretofore was the most commonly used and most advantageous carbon source. The use of monosaccharides (glucose, fructose, mannose) and of disaccharides other than sucrose (maltose) has been investigated, but such alternative carbon sources were generally found to produce less pullulan than sucrose under practical conditions. Even sucrose could usually not be converted to pullulan with a yield better than 12% to 28%, and the cost of the pullulan so produced was not attractive.

It has now been found that partially hydrolyzed starch is not only a cheaper carbon source than sucrose and other sugars used heretofore, but that it yields more pullulan. The hydrolyzed starch employed as the principal or sole significant carbon source in culture media of the invention has a dextrose equivalent (D.E.) of 20 to 70, and preferably of 35 to 60. It is readily obtained by hydrolyzing starch in the presence of an acid or an enzyme, and is converted to pullulan by means of pullulan producing microorganisms in yields as high as 75% or even more. The partially hydrolyzed starch consists mainly or entirely of dextrins or oligosaccharides.

The pullulan producing microorganisms suitable for culturing on media containing partly hydrolyzed starch as a carbon source are various strains of *Pullularia*, such as *P. fermentans* var fermentans IFO 6401, *P. fermentans* var fusca IFO 6402, *P. pullulans* AHU 9553, P. pullulans IFO 6353, also *Dematium pullulans* IFO 4464, and others which will be readily selected on the basis of their ability of converting partly hydrolyzed starch of D.E. 20 to 70 to pullulan having a degree of polymerization suitable for the intended application. If a colorless product is desired, the microbial strain employed should be chosen accordingly since the nature of the microorganism affects the average molecular weight of the pullulan obtained and the degree to which it is contaminated with coloring matter.

The starch employed as a starting material for partial hydrolysis may be chosen freely. Good results have been obtained with cereal starches, such as those of corn maize, waxy maize, or wheat, but also with starches derived from roots or tubers, such as potatoes, sweet potatoes, or tapioca. When the raw material only partly consists of starch, such as rice flour, rice bran, corn grits, and the like, it is preferred to liquefy the starch content of such materials by means of $\alpha$-amylase at the lowest possible temperature (50°–70° C.) and to filter the aqueous solution so obtained to remove insoluble material.

A syrup of hydrolyzed starch suitable for fermentation according to this invention may be prepared by means of an acid or an enzyme in a manner basically known. The hydrolysis must be performed in such a manner as to avoid a product having a D.E. lower than 20 which may contain unreacted dextrin.

Typically, a slurry of starch in water is mixed with sufficient oxalic and/or hydrochloric acid to lower the pH to 2.0 or less, and the mixture is heated at 120° C. or at higher temperature until the desired D.E. is obtained. The resulting solution is cooled to ambient temperature, neutralized with calcium carbonate and/or sodium carbonate, decolorized with active carbon, and deionized by means of ion-exchange resin as is conventional in itself. The colorless liquid may be employed as a base for a culture medium, and its water content may be adjusted by evaporation or dilution, if necessary.

Alternatively, the acid hydrolysis is carried only to the liquefaction of the starch, and the solution is further saccharified by means of $\alpha$-amylase at 60°–70° C. It is also possible to have starch hydrolyzed by means of $\alpha$-amylase only. Acid hydrolysis or the combination of acid and enzyme hydrolysis permits the production of starch syrups having D.E. values of 50 or higher, whereas a D.E. of not much more than 35 is the limit that can be reached by $\alpha$-amylase alone. A hydrolyzate having a D.E. up to about 50 can be prepared by liquefying starch by means of acid or $\alpha$-amylase and further treating the product with malt-amylase. A starch syrup containing much maltose may be prepared by the simultaneous use of isoamylase and maltamylase, and subsequent purification of the hydrolyzate as described above.

The concentration of the partially hydrolyzed starch in the culture medium should be 3% to 30%, and is preferably between 5% and 15% for best pullulan yields, all percentage values in this application being by weight unless specifically stated otherwise. At concentrations of more than 15%, the necessary incubation period is extended and the amount of residual sugar is increased. At concentrations below 5%, the recovery of pullulan requires the dilution of the culture medium with an excessive amount of a water soluble organic solvent in which pullulan is insoluble. The pullulan yield based on the weight of saccharide in the medium decreases with the sugar concentration, but increases when based on the volume of the medium.

The culture medium must contain other nutrients, conventional in themselves and necessary for the growth of the microorganisms, such as a source of assimilable nitrogen which may be an organic or inorganic compound, and minor nutrients such as sources of inorganic ions, for example, potassium phosphate, sodium chloride, magnesium sulfate, ferrous sulfate, and the like.

The preferred initial pH value of the culture medium is between 5.0 and 7.5, and the preferred incubation temperature is 27° to 30° C. The highest pullulan concentration is usually reached in three to eight days, and the highest pullulan yield is attained when culturing can be continued until there is no residual sugar. The degree of polymerization of the pullulan tends to decrease with increasing incubation time, and culturing may have to be interrupted prior to achieving the highest yield if a product of high molecular weight is required. The culture medium may be aerated in any desired and usual manner, and aeration conditions have not been observed to have a significant effect on the outcome of the method.

Upon completion of the incubation, the culture medium is heated to deactivate the enzyme present, and the microbial cells are removed from the liquid medium, preferably by centrifuging. Methanol or another organic solvent readily soluble in water and incapable of dissolving pullulan is added to the cell-free liquor in an amount suitable to precipitate the pullulan. Equal amounts of liquor and methanol are typically mixed for this purpose if the fermentation is carried out under the preferred conditions.

The precipitated pullulan is recovered from the liquor and purified by repeated dissolution in water and precipitation by means of the organic solvent. Purified pullulan is a whitish powder which very readily dissolves in water to form viscous solutions.

The average degree of polymerization of pullulan prepared by the method of the invention has been found to be approximately 1000 to 3000 as determined by means of 3,5-dinitrosalicyclic acid. The product of hydrolysis by means of pullulanase forms a spot characteristic of maltotriose in a paper chromatogram, and the product of acid hydrolysis also shows a spot characteristic of glucose.

The yield of pullulan is affected by the nature, D.E., and concentration of the carbon source as will be shown by the results of comparison tests.

Effect of nature of carbon source

Culture media were prepared to contain 10% carbon source, 0.2% peptone, 0.2% each of $K_2HPO_4$ and NaCl, 0.04% $MgSO_4 \cdot 7H_2O$, and 0.001% $FeSO_4 \cdot 7H_2O$. 100 ml. batches of the several media were placed in 500 ml. flasks, inoculated with pullulan producing microorganisms, and cultivated on a rotary shaker at pH 7.5 and 28° C. for seven days.

The yields achieved, in percent conversion of the carbon sources, are listed in Table 1 in which the carbon sources are identified by numerals:

(1) glucose
(2) sucrose
(3) 90% maltose (D.E. 60.5)
(4) starch hydrolyzed by acid to D.E. 45
(5) starch hydrolyzed by enzyme to D.E. 35

The microorganisms employed are identified by capital letters:

(A) Pullularia pullulans AHU 9553
(B) Pullularia pullulans IFO 6353
(C) Dematium pullulans IFO 4464

TABLE 1

| | Percent of— | | |
|---|---|---|---|
| | (A) | (B) | (C) |
| (1) | 35 | 31 | 43 |
| (2) | 51 | 35 | 54 |
| (3) | 62 | 51 | 61 |
| (4) | 65 | 76 | 75 |
| (5) | 63 | 63 | 72 |

Effect of dextrose equivalent

Starch was hydrolyzed by means of acid to D.E. values of 25 to 70, and by means of enzyme to 25 to 40. The several hydrolyzed starch products were fermented under the conditions of the preceding texts by means of strain (C), and the yields achieved for the two types of hydrolyzate are shown in Table 2, in percent.

TABLE 2

| Dextrose equivalent | 25 | 30 | 40 | 50 | 60 | 70 |
|---|---|---|---|---|---|---|
| Acid-hydrolyzed starch, percent | 45 | 53 | 68 | 76 | 75 | 58 |
| Enzyme-hydrolyzed starch, percent | 47 | 58 | 65 | | | |

As is evident from Table 2, best yields are achieved at D.E. values of approximately 40–60. At a D.E. above 60, the yield is decreased by the predominance of glucose or maltose in the carbon source. At a D.E. of less than 40, the yield declines because the dextrin in the carbon source is not readily converted to pullulan.

Effect of concentration of carbon source

Strain (C) was cultured as in the preceding tests on culture media which differed from each other in the concentration of the carbon source which was either acid-hydrolyzed starch of D.E. 45 or enzyme-hydrolyzed starch of D.E. 40. The results, in percent conversion of the carbon source, are listed in Table 3.

TABLE 3

| Concentration of carbon source, percent | 5 | 10 | 15 | 25 | 30 |
|---|---|---|---|---|---|
| Acid-hydrolyzed starch, D.E. 45, percent | 65 | 75 | 73 | 55 | 50 |
| Enzyme-hydrolyzed starch, D.E. 40, percent | 63 | 72 | 70 | 60 | 54 |

At concentrations below 5%, a predominant portion of the saccharides available is consumed for the growth of the microorganisms. At concentrations higher than 15%, the incubation period must be extended to reduce the amount of residual sugar. In either case, the pullulan yield is decreased.

The following Examples are further illustrative of the method of the invention.

EXAMPLE 1

Dematium pullulans IFO 4464 was cultured on media having the basic composition described above in the test on the effect of the nature of the carbon source, using the carbon sources identified there by numerals (1) to (4), and a carbon source (5a) which differed from the starch hydrolyzate (5) by a D.E. of 40.

Respective 100 ml. batches of the several media were placed in 500 ml. flakes, sterilized at elevated temperature, and inoculated with the microorganism which had been previously cultured on slants for two days and in seed cultures for two days. Cultivation was performed at 27° C. and pH 7.5 with stirring for seven days.

Samples of each culture medium were collected after 3, 5, and 7 days and centrifuged. Each cell-free supernatant was diluted with three volumes methanol to precipitate the polysaccharides present which were purified twice by dissolution in small amounts of water and reprecipitation with methanol. The ultimate precipitates were washed with methanol, dried, and weighed. They were identified as pullulan by hydrolysis with pullulanase and paper chromatography of the hydrolyzate.

The turbidity of each sample was measured after 3 and 7 days after dilution with nine volumes of water, and the pH of the medium was also determined after 3 and 7 days. Residual sugar was determined in the culture media after 3, 5, and 7 days, and is listed below in Table 4 in grams per 100 ml. The Table shows averages of two determinations for each value listed.

TABLE 4

| | pH | | Turbidity | | Residual sugar | | | Yield, percent | | |
|---|---|---|---|---|---|---|---|---|---|---|
| After days | 3 | 7 | 3 | 7 | 3 | 5 | 7 | 3 | 5 | 7 |
| (1) | 4.2 | 4.8 | 0.8 | 1.5 | 5.8 | 3.2 | 0.5 | 21 | 32 | 43 |
| (2) | 4.2 | 4.2 | 0.7 | 1.4 | 5.1 | 1.2 | 0.3 | 30 | 45 | 54 |
| (3) | 4.2 | 4.6 | 0.97 | 2.0 | 6.5 | 3.1 | 0.5 | 10 | 32 | 61 |
| (4) | 4.2 | 4.4 | 0.9 | 1.9 | 5.5 | 1.8 | 0.1 | 38 | 67 | 75 |
| (5a) | 4.2 | 4.2 | 0.9 | 1.8 | 5.1 | 2.0 | 0.3 | 35 | 65 | 72 |

EXAMPLE 2

*Pullularia pullulans* AHU 9553 was cultured under the conditions of Example 1 on culture media respectively containing the following carbon sources:

(1) glucose
(2) sucrose
(6) maltose
(7) starch hydrolyzed in two steps by means of acid and enzyme to D.E. 46
(8) starch hydrolyzed by acid to D.E. 43

Table 5 lists the values of residual sugar and pullulan yield obtained from the several media. The pullulan obtained was slightly colored, and the yield was somewhat lower than in Example 1 under otherwise comparable conditions.

TABLE 5

|  | (1) | (2) | (6) | (7) | (8) |
|---|---|---|---|---|---|
| Residual sugar, g./100 ml | 1.7 | 1.1 | 2.1 | 0.8 | 0.5 |
| Pullulan yield, percent | 35 | 51 | 62 | 63 | 65 |

EXAMPLE 3

*Pullularia pullulans* IFO 6353 was cultured on the media and under the conditions outlined in Example 1 except for an incubation period of five days only. The yields of pullulan were lower than maximum yields in Example 1 because of the shorter incubation period, but the partly hydrolyzed starches still produced 25% to 30% more pullulan than sucrose or glucose. The pullulan obtained was lighter in color than in Example 1 and readily soluble in cold water. It was identified by hydrolysis with pullulanase and paper chromatography as described above. The viscosity of the solutions was much lower than that of corresponding solutions prepared from the pullulans of Example 1.

EXAMPLE 4

*Pullularia pullulans* var fusca IFO 6402 was inoculated on a medium generally as described in Example 1 and containing 15% acid-hydrolyzed starch of D.E. 35 as the sole significant carbon source. After incubation for eight days with stirring at 27° C., no residual sugars were present, and the enzyme was inactivated by heating. The cells were removed, and the pullulan was precipitated from the cell-free liquor by adding three volumes of methanol. The precipitate was recovered and purified by repeated dissolution in water and precipitation with methanol.

A 10% solution of purified pullulan in water was mixed with 200 units pullulanase salted out from a culture of Aerobacter. The mixture was decolorized with active carbon, deionized by means of ion exchange resin, and partly evaporated until a colorless syrup was obtained. The product was pure maltotriose according to its reducing power and the result of chromatographic analysis. The yield of maltotriose was 95%.

An aqueous 30% solution of the maltotriose was placed in an autoclave with 0.3% calcium carbonate and 10% Raney nickel based on the solids present in the solution. The maltotriose was hydrogenated at 100° C. at a hydrogen pressure of 100 kg./cm.$^2$. The hydrogenation mixture was filtered to remove the catalyst, and the filtrate was decolorized and deionized as described above. The colorless lacked reducing power and yielded glucose and sorbitol in a mole ratio of 2:1 when hydrolyzed. The hydrogenation product thus was maltotritol, and was obtained from the maltotriose in a yield of 96%.

While the invention has been described with particular reference to specific embodiments, it is to be understood that it is not limited thereto, but is to be construed broadly and restricted solely by the socpe of the appended claims.

What is claimed is:

1. In a method of producing pullulan by culturing a pullulan producing microorganism under aerobic conditions on a culture medium providing assimilable sources of carbon and nitrogen and minor nutrients necessary to the growth of said microorganism until pullulan is formed in said medium, and recovering the formed pullulan from said medium, the improvement which comprises said source of carbon being a starch hydrolyzate having a dextrose equivalent of 20 to 70.

2. A method as set forth in claim 1, wherein said dextrose equivalent is 35 to 60.

3. A method as set forth in claim 1, wherein said starch hydrolyzate is prepared prior to said culturing by holding starch under hydrolyzing conditions in the presence of water and a hydrolyzing agent selected from the group consisting of an acid and a starch hydrolyzing enzyme until said dextrose equivalent is reached.

4. A method as set forth in claim 3, wherein said hydrolyzing agent is hydrochloric or oxalic acid.

5. A method as set forth in claim 3, wherein said hydrolyzing agent is α-amylase, isoamylase, or maltamylase.

6. A method as set forth in claim 1, wherein said microorganism is *Pullularia fermentans* var fermentans IFO 6401, *Pullularia fermentans* var fusca IFO 6402, *Pullularia pullulans* AHU 9553, *Pullularia pullulans* IFO 6353, or *Dematium pullulans* IFO 4464.

7. A method as set forth in claim 1, wherein said hydrolyzate essentially consists of oligosaccharides.

8. A method as set forth in claim 1, wherein the concentration of said hydrolyzate in said medium is between 5% and 15% by weight.

References Cited

UNITED STATES PATENTS 3,406,114  10/1968  Goren ............. 195—31 P

OTHER REFERENCES

Catley et al., *Arch. Biochem Biophysics* 143, pp. 138–142 (1971).

Catley et al., *Applied Microbiology* vol. 22, No. 4, pp. 641–649 (1971).

Catley et al., *Applied Microbiology* vol. 22, No. 4, pp. 650–654 (1971).

LOUIS MONACELL, Primary Examiner

T. G. WISEMAN, Assistant Examiner